(12) United States Patent
Ogrinz et al.

(10) Patent No.: US 10,917,491 B1
(45) Date of Patent: Feb. 9, 2021

(54) COGNITIVE AUTOMATION-BASED ENGINE TO PROPAGATE DATA ACROSS SYSTEMS

(71) Applicant: Bank of America Corporation, Charlotte, NC (US)

(72) Inventors: Michael Ogrinz, Easton, CT (US); Christine D. Black, Belfast, ME (US); Jayachandra Varma, Irving, TX (US); Jinna Kim, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/808,856

(22) Filed: Mar. 4, 2020

(51) Int. Cl.
*H04L 29/08* (2006.01)
*H04L 29/06* (2006.01)
*G06N 5/04* (2006.01)
*G06F 8/41* (2018.01)
*H04L 12/70* (2013.01)
*H04L 12/853* (2013.01)

(52) U.S. Cl.
CPC .......... *H04L 67/2828* (2013.01); *G06F 8/453* (2013.01); *G06N 5/04* (2013.01); *H04L 67/42* (2013.01); *H04L 47/2416* (2013.01); *H04L 2012/5621* (2013.01)

(58) Field of Classification Search
CPC . H04L 67/42; H04L 67/2828; H04L 47/2416; H04L 2012/5621; G06F 8/453; G06N 5/04
See application file for complete search history.

(56) References Cited

U.S. PATENT DOCUMENTS

2015/0379429 A1* 12/2015 Lee .................. G09B 5/00 706/11

* cited by examiner

*Primary Examiner* — Azizul Choudhury
(74) *Attorney, Agent, or Firm* — Banner & Witcoff, Ltd.; Michael A. Springs

(57) ABSTRACT

Aspects of the disclosure relate to cognitive automation-based engine processing to propagate data across multiple systems via a private network to overcome technical system, resource consumption, and architecture limitations. Data to be propagated can be manually input or extracted from a digital file. The data can be parsed by analyzing for correct syntax, normalized into first through sixth normal forms, segmented into packets for efficient data transmission, validated to ensure that the data satisfies defined formats and input criteria, and distributed into a plurality of data stores coupled to the private network, thereby propagating data without repetitive manual entry. The data may also be enriched by, for example, correcting for any errors or linking with other potentially related data. Based on data enrichment, recommendations of additional target(s) for propagation of data can be identified. Reports may also be generated. The cognitive automation may be performed in real-time to expedite processing.

20 Claims, 5 Drawing Sheets

COGNITIVE AUTOMATION-BASED ENGINE TO PROPAGATE DATA ACROSS SYSTEMS

TECHNICAL FIELD OF DISCLOSURE

Aspects of the disclosure relate to processes, machines, and platforms for data processing, artificial intelligence and, in particular, to knowledge processing of collections of facts, data, information, and relationships to which reasoning techniques are applied in order to propagate data across multiple systems and platforms, and to avoid and/or minimize repetitive data entry.

BACKGROUND

Company employees often spend many hours each week performing repetitive data entry across multiple systems. These repetitive tasks waste computational resources, network resources, hours of employee time, business resources, and company money. Further, repetitive entry of data into multiple systems is a very tedious task, affects productivity, and is prone to manual errors, which may result in data inconsistency. It also presents various technical problems such as an inability of computer systems to automatically reconcile conflicting data entries as well increased computer resource and bandwidth consumption attempting to exhaustively search for, identify, and access disparate systems, data stores, and data warehouses to find conflicting information, filter data in the systems to identify portions that need to be analyzed and updating of each source or repository of data, etc.

An example of this is with respect to a company's sales orders. Sales representatives often need to spend their critical time in entering data to both customer relationship management (CRM) and enterprise resource planning (ERP) systems. CRM helps track and manage customer relationships. For example, CRM includes software applications and systems used by customer service representatives to manage customer interactions, document customer service processes, and implement a customer-centric philosophy and methodology. ERP systems often integrate engineering, planning, materials management, finance and human resources. ERP systems integrate data systems with manufacturing processes to help speed raw material supplies and work with every aspect of an organization to ensure efficient operation.

In this sales order example, employees may have to enter various types of information for every sale into a CRM system, an ERP system, and potentially other systems for every single sale. Consistent and accurate information across all of the systems is crucial in order to manage customer relationships and plan enterprises resources. Sample types of information may include customer names, sales orders, purchase orders, invoicing, products ordered, supply sourcing for manufacturing that corresponds to the orders, inventory, date event tracking, calendar scheduling, sales personnel, customer service personnel, call logs, etc. Such prior art methods of manually entering all of this data into multiple systems is problematic for the foregoing reasons.

This disclosure addresses one or more of the shortcomings in the industry to overcome the technical problems associated with repetitive data entry and propagating data across multiple systems.

SUMMARY

Aspects of the disclosure provide effective, efficient, scalable, and convenient technical solutions that address and overcome the technical problems associated with repetitive data entry and propagation of data across multiple systems by utilizing cognitive automation in inventive processes, machines, and platforms.

In some embodiments, a cognitive automation-based platform for propagating data across multiple systems via a private network can be used to avoid, inter alia, slowing down enterprise computing resources and networks as a result of repetitive data entry by a user. The platform may be implemented in the form of a client-server architecture. The client computing machine can have: at least one client processor; at least one client communication interface communicatively coupled to the at least one client processor and the private network; a client monitor communicatively coupled to the at least one client communication interface; a client keyboard communicatively coupled to the at least one client communication interface; and client memory communicatively coupled to the at least one client communication interface, said client memory storing client computer-readable instructions that, when executed by the at least one client processor, cause the client computing device to perform various functions. The at least one client processor can receive an input source file from a data source. The input source data can be stored in a first sector of the client memory. The input source data to be propagated can be retrieved from the first client sector of the client memory. The input source data can be transmitted, in real-time if desired, from the client computing device to the server computing device.

The server can have: at least one server processor; at least one server communication interface communicatively coupled to the at least one server processor and the private network; and server memory communicatively coupled to the server communication interface. The client memory can store server computer-readable instructions that, when executed by the at least one server processor, cause the server computing device to perform various functions. The input source data that was transmitted can be received from the client computing device. The input source data can be stored in a first server sector of the server memory.

The at least one server processor can parse the input source data into parsed data by analyzing the input source data for correct syntax. The parsed data can be stored by at least one server processor in a second server sector of the server memory. The parsed data can be normalized by the at least one server processor into normalized data by breaking the parsing data into record groups for efficient processing. The normalized data can be normalized by the at least one server processor into at least a first normal form. If desired, the normalized data can be further normalized by the at least one server processor into one or more of a second normal form, a third normal form, a fourth normal form, a fifth normal form, and/or a sixth normal form. The normalized data can be stored by the at least one server processor in a third server sector of the server memory. The normalized data can be segmented by the at least one server processor into segmented data by breaking the normalized data into a plurality of smaller packets for efficient data transmission.

The at least one server processor can store, in a fourth server sector of the server memory, the segmented data. The at least one server processor can validate the segmented data into validated data to ensure that the validated data satisfies defined formats and input criteria. The at least one server processor can store, in a fifth server sector of the server memory, the validated data. The at least one server processor can distribute, by the at least one server processor over the private network, the validated data into a plurality of data stores communicatively coupled to the private network, thereby propagating said validated data without said repetitive data entry by the user. The at least one server processor can enrich the validated data to enriched data that is corrected for any errors. The at least one server processor can store, in a sixth server sector of the server memory, the enriched data. The at least one server processor can generate a recommendation of at least one additional target in which the enriched data may be stored. The at least one server processor can store, in a seventh server sector of the server memory, the recommendation of said at least one additional target in which the enriched data may be stored. The at least one server processor can transmit to the client server processor on the client computing machine over the private network, the recommendation for display in a first graphical user interface on the client monitor. The at least one server processor can store the enriched data in the at least one additional target if approved by the user.

In some embodiments, the input source data can be a digital file. In addition, the digital file may comprise structured and/or unstructured data.

In some embodiments, the server computing machine may perform one or more steps or one or more functions in real-time. These functions including one or more of parsing, normalizing the parsed data, segmenting the normalized data, validating the segmented data, distributing the validated data to a plurality of data stores, enriching the validated data, and generating recommendations to a user of potential additional target systems or target locations where the data may be optionally propagated.

In some embodiments, the data source may be populated based on a manual entry of information by the user via the client keyboard in response to a second graphical user interface displayed on the client monitor.

In some embodiments, a report or log may be generated to report on one or more aspects of the cognitive automation process or on the propagation of data to multiple systems.

In some embodiments, one or more non-transitory computer-readable media can store instructions that, when executed by a cognitive automation computing platform comprising a plurality of processors in a client-server architecture communicatively coupled over a private network via a plurality of communication interfaces, may provide the cognitive automation-based functionality of the present disclosure. A first of said plurality of processors may receive, from a data source, input source data. The first of said plurality of processors may store, in a first sector of the computer-readable media, the input source data. The first of said plurality of processors may extract (in real-time if desired), from the input source data in the first sector of the computer-readable media, data to be propagated. The first of said plurality of processors may store (in real-time if desired), in a second sector of the computer-readable media, the data to be propagated. The first of said plurality of processors may transmit (in real-time if desired) the data to be propagated to a second of said plurality of processors, which would receive the data to be propagated (again, in real-time if desired).

The second of said plurality of processors may store (in real-time if desired), in a third sector of the computer-readable media, the data to be propagated. The second of said plurality of processors may parse (in real-time if desired) the data to be propagated into parsed data by analyzing the data to be propagated for correct syntax. The second of said plurality of processors may store (in real-time if desired), in a fourth sector of the computer-readable media, the parsed data. The second of said plurality of processors may normalize (in real-time if desired) the parsed data into normalized data by breaking the parsing data into record groups for efficient processing. The normalized data can be normalized into at least a first normal form or further normalized into forms two through sixth. The second of said plurality of processors may store (in real-time if desired), in a fifth sector of the computer-readable media, the normalized data. The second of said plurality of processors may segment (in real-time if desired) the normalized data into segmented data by breaking the normalized data into a plurality of smaller packets for efficient data transmission. The second of said plurality of processors may store (in real-time if desired), in a sixth sector of the computer-readable media, the segmented data. The second of said plurality of processors may validate (in real-time if desired) the segmented data into validated data to ensure that the validated data satisfies defined formats and input criteria. The second of said plurality of processors may store (in real-time if desired), in a seventh sector of the computer-readable media, the validated data. The second of said plurality of processors may distribute (in real-time if desired), over the private network, the validated data into a plurality of data stores communicatively coupled to the private network, thereby propagating said validated data without repetitive data entry. The second of said plurality of processors may enrich (in real-time if desired) the validated data to enriched data that is corrected for any errors. The second of said plurality of processors may store (in real-time if desired), in an eighth sector of the computer-readable media, the enriched data. The second of said plurality of processors may generate (in real-time if desired) a recommendation of at least one additional target in which the enriched data may be stored. The second of said plurality of processors may store (in real-time if desired), in a ninth sector of the computer-readable media, the recommendation of said at least one additional target in which the enriched data may be stored. The second of said plurality of processors may transmit (in real-time if desired) to the first of said plurality of processors, over the private network, the recommendation. The second of said plurality of processors may store the enriched data in the at least one additional target if approved.

In some embodiments, a cognitive automation-based method for propagating data across multiple systems via a private network to avoid repetitive data entry by a user can be implemented. The method may comprise one or more steps such as: receiving, by a cognitive automation platform from a data source, input source data; storing, by the cognitive automation platform in a first sector of computer-readable media, the input source data; extracting (in real-time if desired), by the cognitive automation platform from the input source data in the first sector of the computer-readable media, data to be propagated; storing (in real-time if desired), by the cognitive automation platform in a second sector of the computer-readable media, the data to be propagated; parsing (in real-time if desired), by the cognitive automation platform, the data to be propagated into parsed data by analyzing the data to be propagated for correct syntax; storing (in real-time if desired), by the cognitive automation platform in a fourth sector of the computer-readable media, the parsed data; normalizing (in real-time if desired), by the cognitive automation platform, the parsed data into normalized data by breaking the parsing data into record groups for efficient processing, said normalized data normalized into at least a first normal form or optionally further into forms two through sixth; storing (in real-time if desired), by the cognitive automation platform in a fifth sector of the computer-readable media, the normalized data; and segmenting (in real-time if desired), by the cognitive automation platform, the normalized data into segmented data by breaking the normalized data into a plurality of smaller packets for efficient data transmission; storing (in real-time if desired), by the cognitive automation platform in a sixth sector of the computer-readable media, the segmented data.

The method may further comprise validating (in real-time if desired), by the cognitive automation platform, the segmented data into validated data to ensure that the validated data satisfies defined formats and input criteria; storing (in real-time if desired), by the cognitive automation platform in a seventh sector of the computer-readable media, the validated data; distributing (in real-time if desired), by the cognitive automation platform over the private network, the validated data into a plurality of data stores communicatively coupled to the private network, thereby propagating said validated data without repetitive data entry; enriching (in real-time if desired), the cognitive automation platform, the validated data to enriched data that is corrected for any errors; storing (in real-time if desired), by the cognitive automation platform in an eighth sector of the computer-readable media, the enriched data; generating (in real-time if desired), by the cognitive automation platform, a recommendation of at least one additional target in which the enriched data may be stored; storing (in real-time if desired), by the cognitive automation platform in a ninth sector of the computer-readable media, the recommendation of said at least one additional target in which the enriched data may be stored; transmitting (in real-time if desired), by the cognitive automation platform over the private network, the recommendation; and storing, by the cognitive automation platform, the enriched data in the at least one additional target if approved by a user.

In some embodiments, the input source data can be generated, by server or other processor(s), by scanning a digital file.

In some embodiments, the input source data can be generated, by server or other processor(s), by performing optical character recognition on the digital file.

In some embodiments, the input source data can be generated, by server or other processor(s), by forecast validation based on prognostic output from at least one numerical model.

In some embodiments, the input source data can be generated, by server or other processor(s), by regression validation by determining whether an output of a regression model is adequate.

In some embodiments, the input source data can be generated, by server or other processor(s), by social validation to verify compliance in a social activity.

In some embodiments, the input source data can be generated, by server or other processor(s), by statistical model validation to determine with outputs of a statistical model are acceptable.

In some embodiments, the input source data can be generated, by server or other processor(s), by documenting that a process meets predetermined specifications and fulfills an intended purpose.

In some embodiments, the input source data can be generated, by server or other processor(s), by checking whether segmented data follows a defined structure.

In some embodiments, some or all server computer-readable instructions are performed in real-time.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
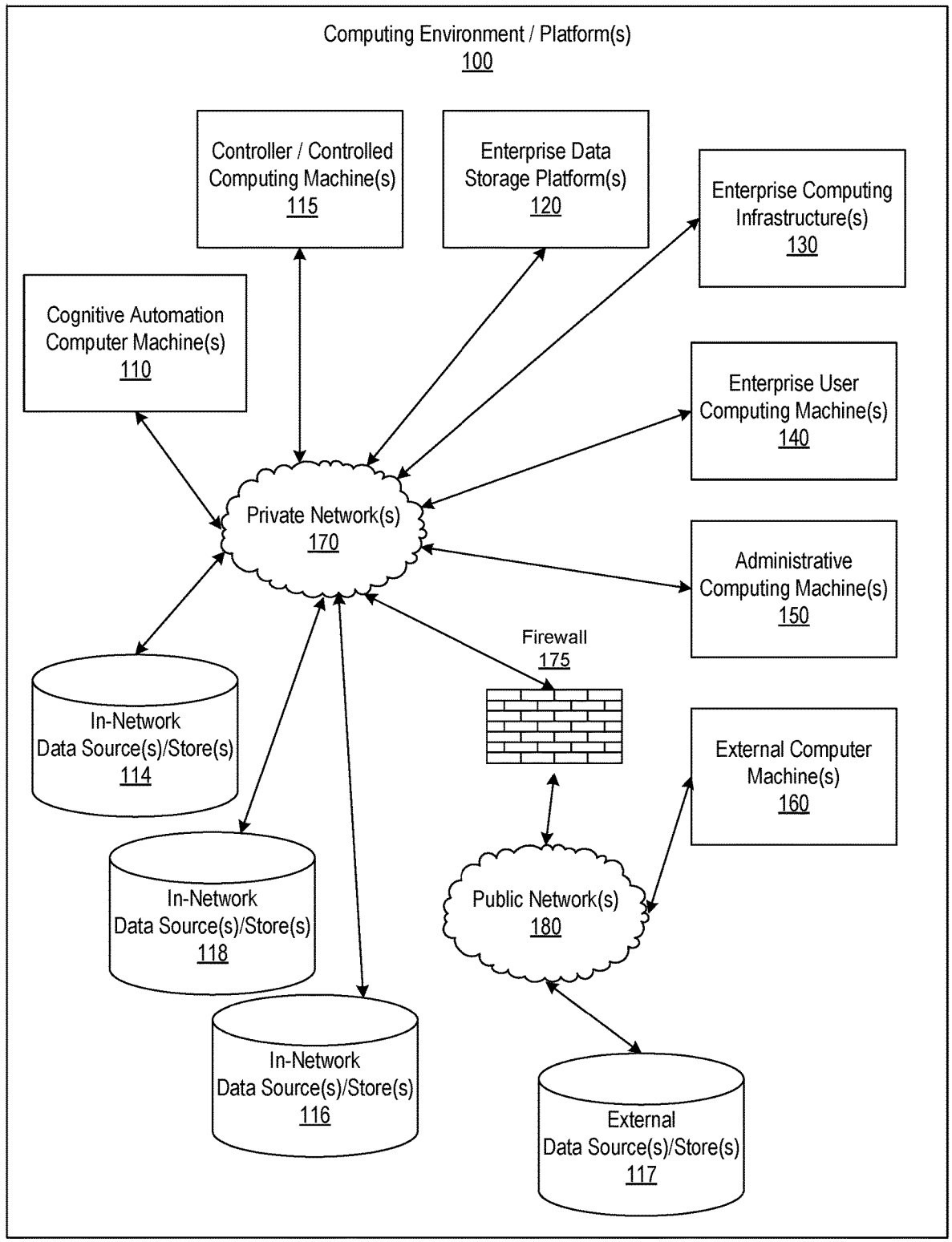
FIGS. 1 and 2 depict illustrative computing environment(s), client-server configurations, cognitive automation computer machines, platform(s), and/or module(s), in accordance with one or more environments, for processing data from disparate sources and propagating the data to target applications and data stores.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases and data structures (including cubes, hypercubes, data warehouses, multidimensional databases, multidimensional database management systems, multidimensional data structures, online analytical processing (OLAP) applications, cubes and data storage, relational databases, etc.), datasets, data sources, drivers, file systems or distributed file systems, firmware, graphical user interfaces, images, instructions, machine learning, middleware, modules, objects, operating systems, processes, protocols, programs, scripts, tools, and utilities. The computer-executable software and data is on tangible, computer-readable memory (local, in network-attached storage, remote, and/or online), can be stored in volatile or non-volatile memory, and can operate automatically and/or autonomously, based on event triggers, on-demand, on a schedule, and/or as part of batch processing. It can operate in real time or otherwise.

"Computer machine(s)" and "cognitive automation machine(s) and/or platform(s") can include one or more: special-purpose network-accessible administrative computers, clusters, computing devices or computing machine(s), computing platforms, desktop computers, distributed systems, enterprise computers, laptop or notebook computers, controller computers, nodes, personal computers, portable electronic devices, servers, controlled computers, smart devices, tablets, and/or workstations, which have one or more microprocessors, cores, and/or executors such as for executing or accessing the computer-executable software and data. References to computer machines and names of devices included within this definition are used interchangeably in this specification and are not considered to be limiting or exclusive to only a specific type of device or type of user. Instead, references in this disclosure to computer machines, platforms, and the like are to be interpreted broadly as understood by skilled artisans. Further, as used in this specification, computer machines also include all hardware and components typically contained therein such as, for example, processors/executors/cores 111, volatile and non-volatile memories 112, modules in memory 112a-112u, communication interfaces 113, monitor(s) 118, and keyboards (not shown) or other input devices (not shown) etc.

Volatile and non-volatile memories may be comprised of one or more computer-readable media containing a plurality of sectors. As used herein, a "sector" is broadly defined as subdivision(s) or block(s) of memory and is not limited to the minimum storage unit of a hard drive or other computer-readable medium. Further, the sector may have a fixed size or may be variable.

Computer "networks" can include one or more local area networks (LANs), wide area networks (WANs), the Internet and public networks 180, wireless networks, digital subscriber line (DSL) networks, frame relay networks, asynchronous transfer mode (ATM) networks, private networks 170, virtual private networks (VPN), or any combination of any of the same. Networks also include associated "network equipment" such as access points, ethernet adaptors (physical and wireless), firewall(s) 175, hubs, modems, routers, security devices, and/or switches located inside the network and/or on its periphery, as well as software executing on any of the foregoing.

FIG. 1 depicts a various aspects of an illustrative computing environment(s) as well as cognitive automation computer machine(s), platform(s), internal and external computer machine(s), in-network and external data source(s)/data store(s), etc., in accordance with one or more environments, for processing data from disparate sources and propagating the data to target applications and data stores.

Referring to FIG. 1, computing environment/computing platform(s) 100 may include one or more computer machine(s), system(s), and/or platform(s). For example, computing environment 100 may include various computer machine(s) such as one or more cognitive automation computer machine(s) 110, controller and/or controlled computers 115 for distributed processing, enterprise data storage platform(s) 120, enterprise computing infrastructure 130, enterprise user computing machine(s) 140, administrative computing machine(s) 150, and external computer system(s) 160 for remote access and/or processing, or performing any other functions or actions. In addition, client-server arrangements may be implemented using one or more of the foregoing. For example, the cognitive automation computer machine(s) 110 could be implemented as one or more server(s) to provide services and functions to one or more client machines such as enterprise user computing machine(s) 140, administrative computer machine(s) 150, external computer system(s) 160, one or more other infrastructures, and the like.

As illustrated in greater detail below, each element in computing environment 100 may include one or more computing machine(s) and associated components operating computer software and data configured to perform one or more of the functions described herein. Moreover, the functions performed by one machine or platform could be implemented on another machine or platform in the environment in accordance with one or more various embodiments of this disclosure. Computing environment 100 also includes one or more in-network data sources/data stores 114, 118, and 116, which may contain applications or other computer software and data. Computing environment 100 may also include one or more external data sources/data stores 117, which may also contain applications or other computer software and data. The data stores 114, 116, 117 and 118 may contain any type of company information such as data pertaining to sales, inventory, marketing, supplies, calendars, scheduling, accounting, human resource, CRM, ERP, or any other type of data to be maintained in any type of data store or application. The data stores may be coupled to and accessible from a network such as, for example, by a network-attached storage medium and/or device. Additionally or alternatively, the data stores 114, 116, 117, and 118 may be implemented, in whole or in part, internally as part of one or more of any of cognitive automation computer machine(s) 110, controllers and/or controlled computers 115 for distributed processing, an enterprise data storage platform 120, enterprise computing infrastructure 130, an enterprise user computing machine 140, an administrative computing machine 150, and an external computer system 160.

In addition, and as illustrated in greater detail below, cognitive automation computer machine(s) 110, controller and controlled computing machine(s) 115, enterprise computer infrastructures 130, and enterprise user computing machine(s) 140, may be configured to perform various distributed processing functions described herein as well as retrieve, parse, segment, process, normalize, store, access, validate, analyze, distribute, enrich, propagate, and/or otherwise act on enterprise or other data. Enterprise computing infrastructure 130 may include one or more computer machines and/or other computer components. In addition, and as illustrated in greater detail below, enterprise computing infrastructure 130 may be configured to provide various enterprise and/or back-office computing functions for an organization, such as a financial institution. For example, enterprise computing infrastructure 130 may include various computer machines and/or computer-executable software and/or data that store and/or otherwise contain account information, such as financial account information including account balances, transactions, transaction history, account owner information, and/or other information. In addition, enterprise computing infrastructure 130 may process and/or otherwise execute transactions on specific accounts or from various users based on commands and/or other information received from other computer systems included in computing environment 100. Additionally or alternatively, enterprise computing infrastructure 130 may load data from enterprise data storage platform 120 or another data store, manipulate and/or otherwise process such data, and return modified data and/or other data to enterprise data storage platform 120 and/or to other computer machines or systems included in computing environment 100.

Cognitive automation computer machine(s) 110 may be any type of computer machine and may be linked to and/or used by a specific enterprise user (who may, e.g., be an employee, customer, or affiliate of an enterprise organization tasked with entering data, updating data, and/or propagating data). Enterprise user computing device 140 may be any type of computer machine and may be linked to and/or used by a specific enterprise user (who may, e.g., be an employee or other affiliate of an enterprise organization controlling and/or interacting with controller and controlled computing device(s) 115 or any other computer machines). Administrative computing device 150 may be any type of computer machine and may be linked to and/or used by an administrative user (who may, e.g., be a network administrator of an enterprise organization controlling and/or interacting with controller and controlled computing device(s) 115 or any other computer machines). Enterprise computer system 160 may be any type of computer machine and may be linked to and/or used by one or more external users (who may, e.g., not be associated with an enterprise organization controlling and/or interacting with controller and controlled computing device(s) 115 or any other computer machines).

Computing environment 100 also may include one or more networks, which may interconnect one or more of cognitive automation computer machine(s) 110, controller and controlled computer machine(s) 115, in-network data source(s)/store(s) 114, 116, 118, external data source(s)/store(s) 117, enterprise data storage platform 120, enterprise computing infrastructure 130, enterprise user computing device 140, administrative computing device 150, and external computer system 160.

Computing environment 110 may include one or more firewalls 175, which protect or filter data for machines, platforms, data and the like, inside the private network from unauthorized users or processes operating outside the private network.

In one or more arrangements, computer machine(s) and the other system(s) included in computing environment 100 may be any type of computing device(s) capable of providing a user interface, receiving input via the user interface, acting on the input, accessing or processing data, controlling other computer machine(s) and/or component(s) thereof based on the input, communicating the received input to one or more other computing machine(s), and propagating data to other machine(s), platform(s), system(s), data source(s)/data store(s), and the like. As noted above, and as illustrated in greater detail below, any and/or all of the computer machine(s) of computer environment 100 may, in some instances, be special-purpose computing device(s) configured to perform specific functions.

Figure 2:
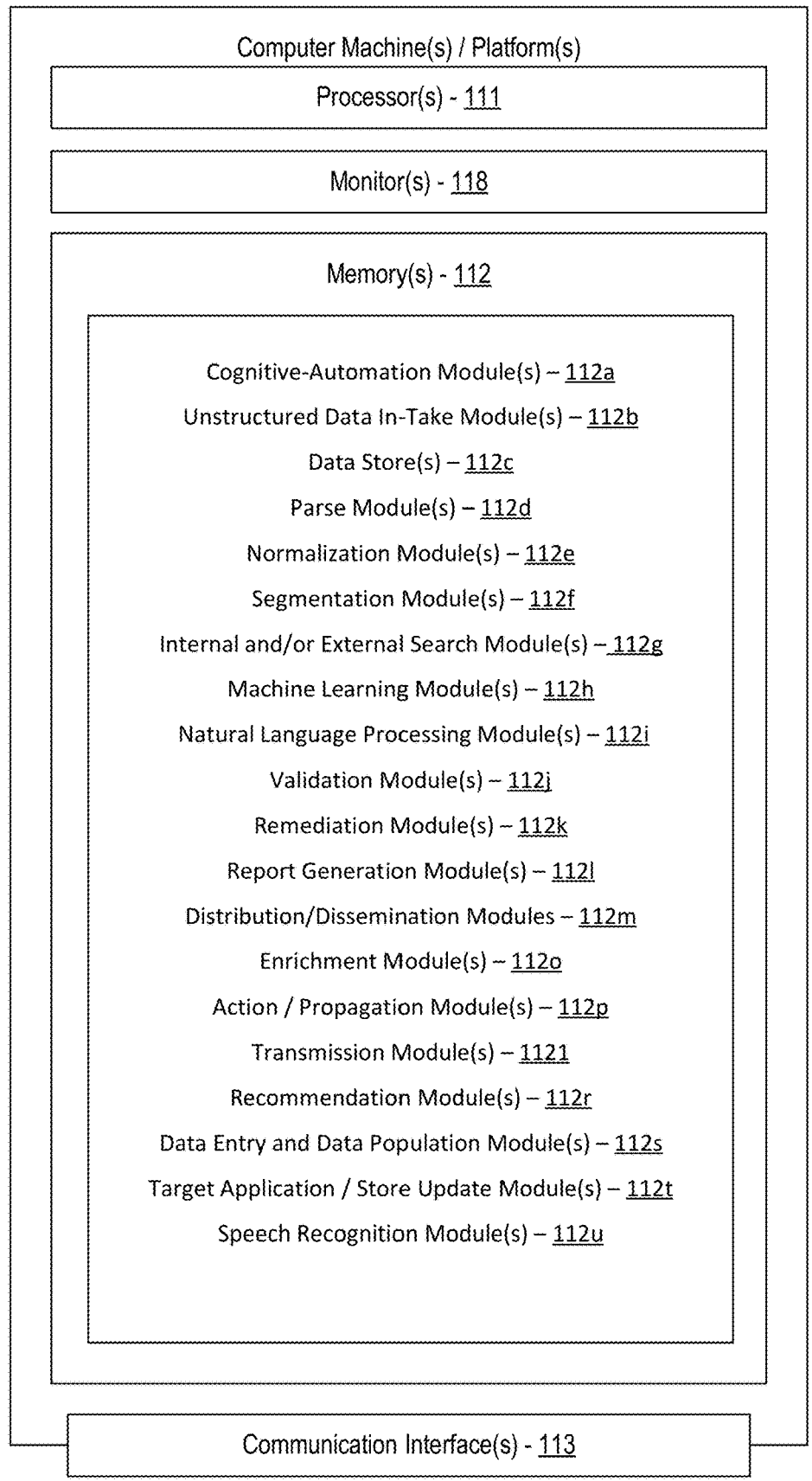

Referring to FIG. 2, one or more computer machine(s) or platform(s), such as, for example, cognitive automation machine 110, may include one or more processors, executors, cores, etc. 111, memory 112, communication interface 113, and monitor(s) 118. A data bus may interconnect processor 111, memory 112, and communication interface 113. Communication interface 113 may be a network interface configured to support communication between one or more computer machines in computer environment 100 and one or more networks (e.g., private network 170, public network 180, or the like).

Memory 112 may be volatile or non-volatile, and may include computer software and data such as, for example, one or more program modules having instructions that when executed by processor 111 cause a computer machine, such as information security computer machine(s) 110, to perform one or more functions described herein and/or access, process, analyze, manipulate, interact with, perform data acquisition, and/or control one or more data stores or data warehouses, big data, or other file systems that may store and/or otherwise maintain information which may be used by such program modules and/or processor 111. In some instances, one or more program modules, data, and/or databases may be stored by and/or maintained in different memory units (local or accessible across the network) of computer machines and/or by different computing devices that may form and/or otherwise make up a collection of computer machines.

Sample program modules, data, and/or databases stored or maintained in memory may include, but are not limited to: Cognitive Automation Module(s)—112a (e.g., for performing general cognitive automation functions as known in the industry); Unstructured Data In-Take Module(s)—112b (e.g., for ingesting raw data that was manually entered and/or automatically acquired from digital data in a data source); Data Store(s)/Data Source(s)/Data Warehouse(s)—112c (e.g., data repositories or sources of digital data); Parse Module(s)—112d (e.g., for parsing unstructured data); Normalization Module(s)—112e (e.g., for normalizing the parsed data); Segmentation Module(s)—112f (e.g., for segmenting the normalized and parsed data); Internal and/or External Search Module(s)—112g (e.g., to facilitate searching and extraction of data); Machine Learning Module(s)—112h (e.g., code to perform tasks without using explicit instructions such as with supervised learning, semi-supervised learning, and unsupervised learning); Natural Language Processing Module(s)—112i (e.g., for automatic manipulation and automatic computational processing of natural language like speech and text by software); Validation Module(s)—112j (e.g., for validation of data); Remediation Module(s)—112k (e.g., for making remediations to processes and/or data based on human or other corrections to outputs at various stages in the cognitive processing); Report Generation Module(s)—1121 (e.g., to provide reports or logs regarding various aspects of the cognitive automation process); Distribution/Dissemination Modules—112m (e.g., for distributing the processed data); Enrichment Module(s)—112o (e.g., for improving the processed data); Action/Propagation Module(s)—112p (e.g., to take actions on the data and/or propagate it based on cognitive automation rules); Transmission Module(s)—1121 (e.g., for sending data across communication channels or network architectures); Recommendation Module(s)—112r (e.g., for providing users with a recommendation in terms of changes to be made or for additional systems or locations to which data may be propagated such as through use of a computer prompt or other graphical user interface); Data Entry and Data Population Module(s)—112s (e.g., for manual entry of data or automatic data population); and/or Target Application/Store Update Module(s)—112t (e.g., for storing data in target applications or destinations to obviate the need for repetitive data entry), and/or Speech Recognition Module(s)—112u (e.g., to recognize speech and language in digital representations of spoken data such as in recorded telephone calls or recorded meetings).

Figure 3:
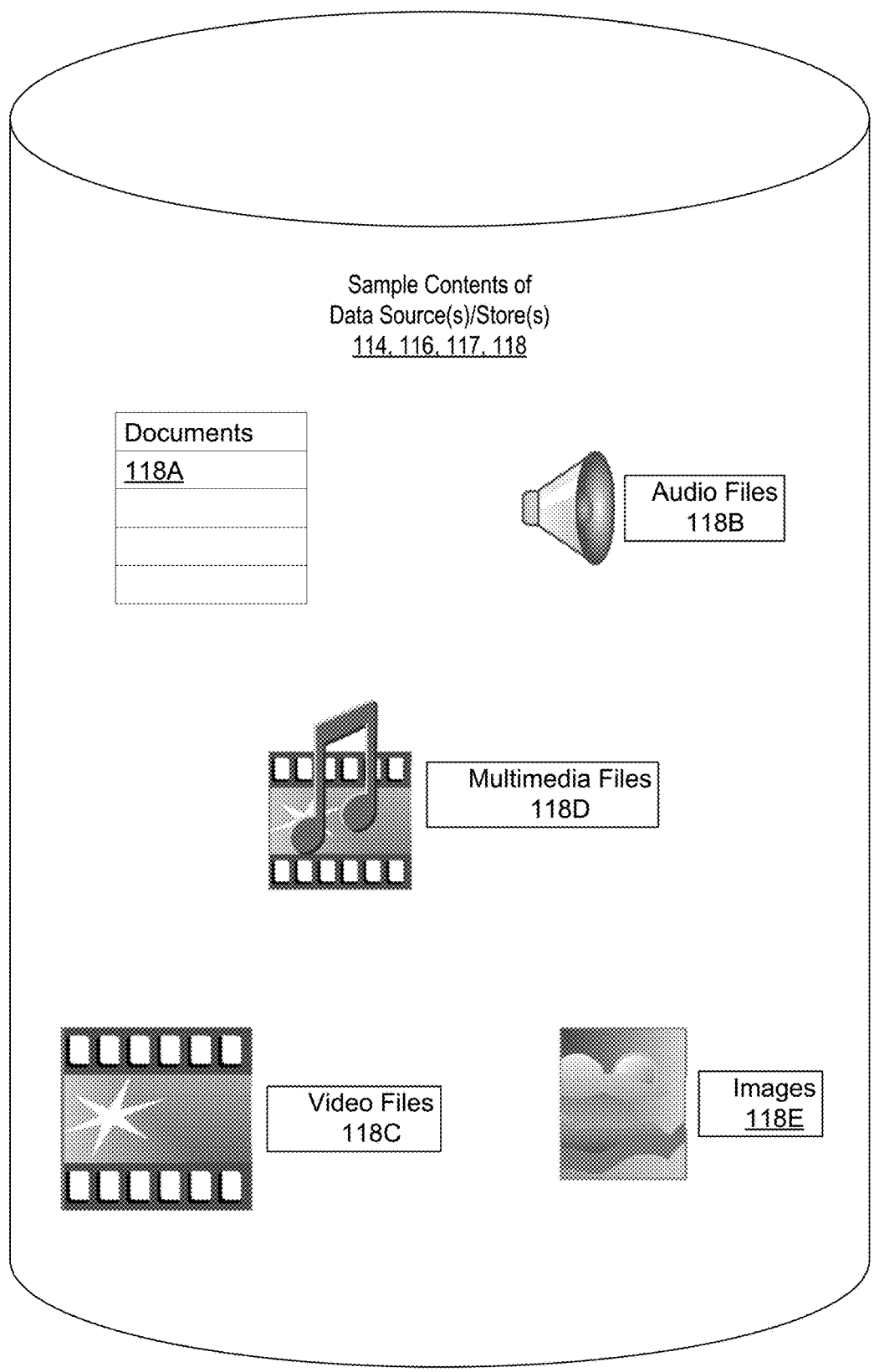
FIG. 3 depicts sample contents of data sources and/or data stores, in accordance with one or more environments, for processing data from disparate sources and propagating the data to target applications and data stores.

Referring to FIG. 3, digital data and information in any documents, files or the like in one data store (e.g., in-network data source(s)/store(s) 114, 116, 118) can be accessed by cognitive automation computer machine(s) as one or more inputs and/or can be written to, by the cognitive automation computer machine(s), in order to propagate data from one source to one or more other data source(s)/data store(s) (e.g., in-network or external data source(s)/store(s) 114, 116, 117, and 118). The digital information can be parsed, normalized, segmented, validated, distributed and/or disseminated, as appropriate, in order to facilitate propagation of data to avoid repetitive data entry.

Figure 4:
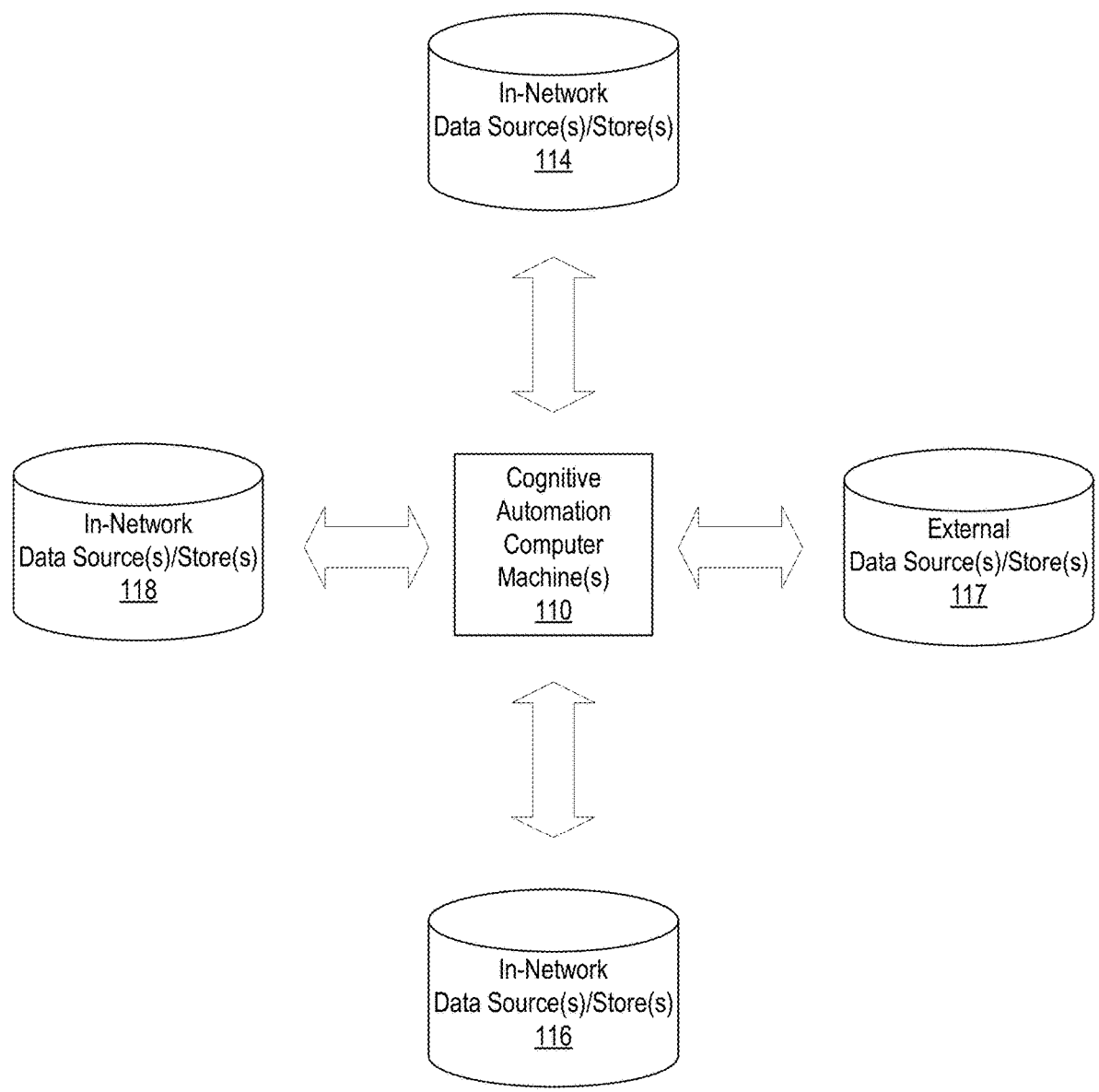
FIG. 4 depicts a sample functional overview of and information propagation between data sources/data stores (or applications contained therein) and cognitive automation computer machines, platforms, and/or modules, in accordance with one or more environments, for processing data from disparate sources and propagating the data to target applications and data stores.

Referring to FIG. 4, data source(s)/store(s) 114, 116, and 118, and external data source(s)/store(s) 117, may contain any type of digital data or information stored in isolation and/or across multiple systems or stores. Sample digital data and/or files includes electronic documents 118A (e.g., notes, word processor files, spreadsheets, etc.), audio files 118B (e.g., phone or other recordings), multimedia files 118D (e.g., video conferencing recordings), video files 118C (e.g., moving screen captures/recordings or videotaping), images 118E (e.g., photographs, still screen captures, etc.), and the like.

There are various scenarios and processes in which it would be beneficial for a cognitive automation-based engine to propagate data across systems having their own data stores in order to maximize efficiency and avoid time-consuming repetitive data entry in those data stores.

In one or more embodiments, cognitive automation technology is used to identify information to be propagated without having to have a human look at it. All the different interconnected systems where the same data might be entered can be identified automatically so that a user does not have to manually identify each system and then enter the same data in five or more different systems. Each of the different systems can be interconnected together through the cognitive automation tool such that when information is identified or entered once, it can thereafter be propagated out.

As an example, repetitive data entry in customer relationship management (CRM) and enterprise resource planning (ERP) systems illustrates the need for the present invention and how the cognitive-based engine in cognitive automation machine(s) 110 can overcome the prior art technical problems of manual, time consuming, inaccurate, and unproductive entry of data into multiple systems.

For example, in the context of a company's sales orders, the cognitive-based engine of one or more embodiments allows companies to automatically update, track, and manage customer relationships including their software applications and systems used by customer service representatives to manage customer interactions, document customer service processes, and implement a customer-centric philosophy and methodology, as well as automatically update, track, and manage enterprise resource planning systems including manufacturing, ordering of raw material supplies, engineering, planning, materials management, finance and human resources, and like processes. This is accomplished by integrating the various systems with one another such that data entry into any one or more of the foregoing is entered one time, manually and/or automatically by machine analysis of a data file in data source and/or data store, and then propagated out to all other applicable systems automatically and/or through a series of manual prompts or suggestions by the cognitive automation machines that identify all other systems, data store(s), and/or data source(s) like shown in FIG. 4.

In this context, samples of types of information that could be entered once, perhaps in the scenario of a sales order, and then propagated out manually and/or automatically, include customer names, account numbers, sales orders, purchase orders, invoicing, products ordered, quantity of products ordered, supply sourcing for manufacturing that corresponds to the orders, inventory, date event tracking, calendar scheduling, sales personnel, customer service personnel, call logs, etc. Automatic propagation may include, for example, authentication of potential updates; identifying known repositories where the information is known to reside and/or parsing indices of identifying locations of the applicable known repositories; searching databases, data stores, and data warehouses, and the like, based on the identifying information to flag data structures or other files contained therein that need to be updated; reconciling data entries across disparate systems such that the information can be updated; updating (and creating if desired) indices or other repository references tracking locations of like information; and/or verification of changes to repositories.

As such, in a more detailed example, a customer service representative might take an order via a recorded telephone call. The order might be for the purchase of five computers. During the call, the sales representative would collect, inter alia, the customer name, telephone and address information, account number, purchase order number, products ordered, date of the order, shipping method, etc. Once entered, the cognitive automation machine 110 could analyze the data (as detailed below) in real-time and then propagate, such as described above, the information to, inter alia, one or more systems, applications, data stores or the like in a manufacturing department's computer infrastructure or the like. The cognitive automation machine 110 and/or the manufacturing department's infrastructure could then update applicable records and/or data repositories to reflect the order, compare the quantity of products ordered and the model of the product ordered to its current inventory of finished materials as well as its current inventory of components on hand to make finished materials. If necessary, automatic orders to source or purchase additional components necessary to make the finished products could be updated and placed with suppliers either by one or more cognitive automation machine(s) 110 or infrastructure computing devices managing manufacturing processes or the like. Additionally, cognitive automation machine(s) 110 or infrastructure computing devices could update and/or populate the shipping information for delivery of the products once assembled in the manufacturing systems data source(s)/data store(s) in order to facilitate rapid shipping of the computers once assembled and with error free shipping addresses automatically having been entered once by the sales representative and propagated to the manufacturing departments systems.

Figure 5:
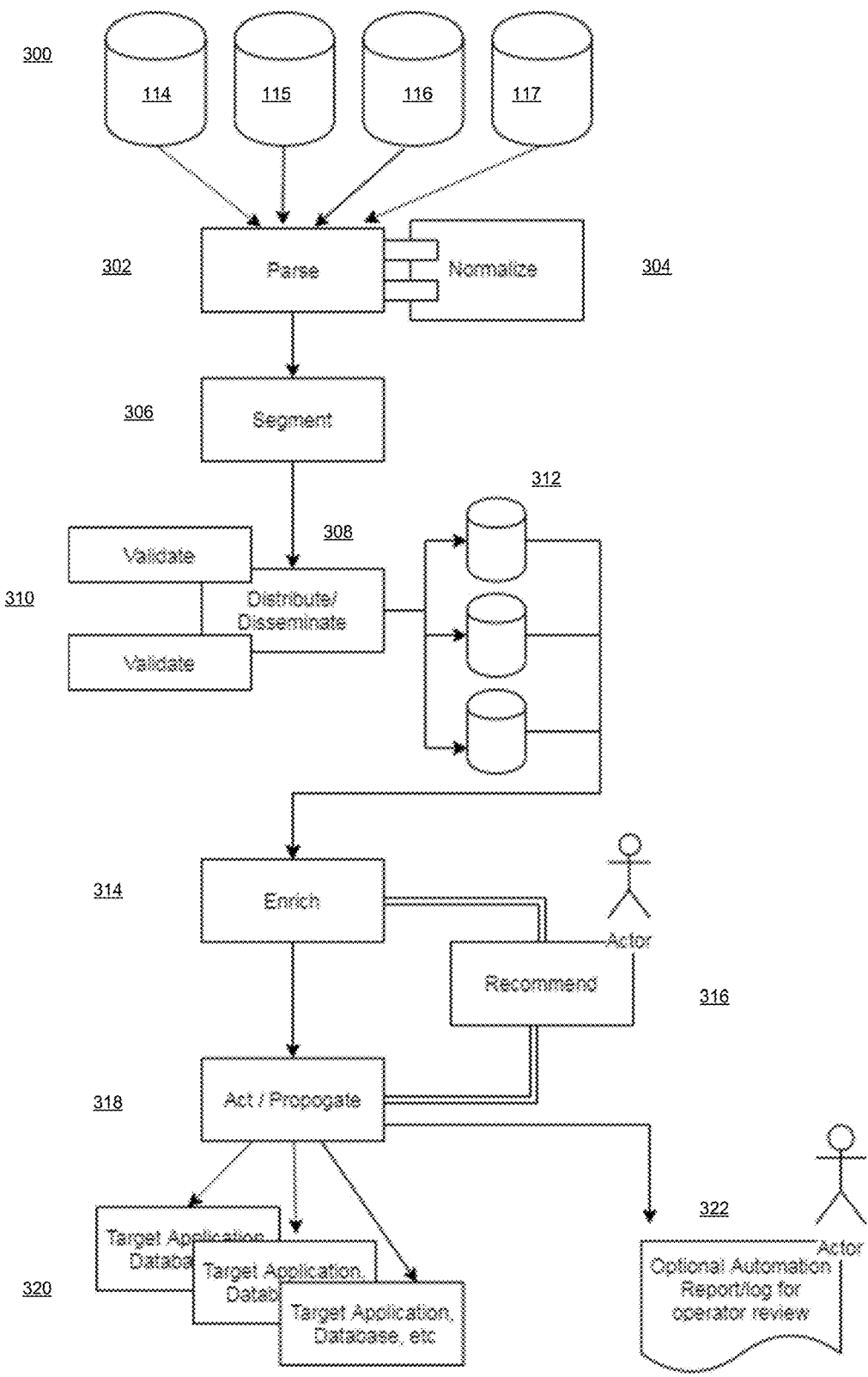
FIG. 5 depicts sample high-level representation(s) of the flow of algorithm(s) to implement various aspects of the cognitive automation processing and propagation of data, in accordance with one or more embodiments.

This can be accomplished by the cognitive automation-based engine in cognitive automation computing machine 110 of one or more embodiments of this disclosure such as illustrated in FIG. 5. In particular, cognitive automation as used herein is a subset of artificial intelligence—using specific AI techniques that mimic that way the human mind works—to assist humans in propagating data including entering data, making decisions, completing tasks, or meeting goals. In the context of the present disclosure, this means using technologies such as natural language processing, image processing, pattern recognition, and contextual analyses to make automated and more intuitive leaps, perceptions, and judgments, and automatically learn, discover, and make recommendations or predictions, all of which obviates the need for repetitive data entry into multiple systems. In particular, unstructured data can be used to build relationships and/or otherwise act on or propagate appropriate information captured from the unstructured data. This allows the cognitive automation engine to determine if something has been seen before and if so, where; what was done in the similar instance; is it connected to and/or related to something that has been seen before; what is the strength of the connection; and what was involved. Further, the cognitive automation engine such as in cognitive automation machine(s) 110 and/or hosted and executed on servers performing one or more of the cognitive automation functions can be pretrained to automate specific business processes and data entry, and thus need less data before actions can be taken, avoid requiring help from data scientists and/or IT professionals to build elaborate models. As such, the cognitive automation engine can be implemented in a client-server architecture or on a standalone machine in one or more embodiments of this disclosure, and can be used by business owners themselves and can be operational in just a few weeks. As new data is added to the cognitive automation system, the system can make more and more connections. This allows the cognitive automation system to keep learning unsupervised, and constantly adjust to the new information being fed and analyzed. Importantly, one or more aspects of the cognitive automation engine of this disclosure can capture data, process it, propagate it, and make decisions in real time.

In another sample scenario in the context of, for example, new inventions invented by inventors, inventors will recognize that the invention process typically begins with an invention disclosure meeting with a patent attorney. The patent attorney and all of the inventors may conduct the disclosure meeting on a telephone conference call.

During the meeting, the patent attorney would likely take copious notes during the call. The inventors may provide their full name as well as their residence and citizenship information, which is required as part of formal papers for the patent application. The meeting notes would likely include a list of everyone on the call, their email addresses, the date of the call, the duration of the call, the title of the invention, a detailed discussion of the inventions, action items to follow up on, a discussion of due dates, known prior art, etc.

The cognitive automation-based engine of one or more embodiments of the present disclosure, such as in cognitive automation computing machine(s) 110, other special purpose computers, and/or client-server machines, infrastructure computing devices or the like could take as an input the meeting notes, process the information, and propagate it out to various systems thereby obviating the need for repetitive data entry and eliminating the possibility of data entry error.

For example, the cognitive automation-based engine could recognize from the meeting notes who the inventors are, their residence, their citizenship, and the title of the invention. This information could be propagated out to a database of inventor declarations and a separate database of inventor assignments. The declarations and assignments could then be automatically created by the cognitive automation-based engine rather than requiring repetitive manual entry of the information over and over in each separate document.

Similarly, the cognitive automation-based engine could recognize from the meeting notes who the inventors are, their email addresses, residential addresses, etc. and could store that information in a series of contacts for the inventors and create an email distribution list for the inventors. Contacts could be stored in a contact database along with email distribution lists. Automatic reminder emails and follow up emails to the inventors could be populated and sent from an email database. Such emails may include reminders regarding identification of known prior art, reminders to provide additional information or drawings, reminders to execute the formal papers, etc. Other automatic emails, such as distribution of the meeting notes, could be circulated as well.

Relatedly, the cognitive automation-based engine could recognize from the meeting notes and future follow up meetings that are discussed. This information could be propagated from the meeting notes to one or more calendar databases and/or calendar invites could automatically be routed to the email distribution lists.

Also, the cognitive automation-based engine could make suggestion based on the email notes regarding other databases where some of the relevant information may need to be stored or updated. For example, the engine could recognize that the address or citizenship information for one of the inventors has changed and the engine could make suggestions to the patent attorney to check files for patent applications for other pending cases to ensure that the new residential and citizenship information is updated in those attorney files.

By using the cognitive automation-based engine of the one or more embodiments described herein, repetitive data entry can be avoided.

Referring more specifically to FIG. 5, unstructured data 300 which is manually entered or automatically acquired from internal and/or external data source(s)/data store(s) 114, 115, 116, and 117 can be used as input to cognitive automation computer machine(s) 110, cognitive automation processes implemented in various client-server architectures, and/or network or system infrastructures, a cognitive automation system, and/or be included in one or more of such system(s).

As an example, in the context of cognitive automation machine(s) 110 (or implemented in any of the like as suggested above), unstructured data 300 is parsed in step 302 by cognitive automation computing machine(s) 110. In particular, the unstructured data 300 is processed into components by cognitive automation computing machine(s) 110, which then analyze the data 300 for correct syntax and then attached by cognitive automation computing machine(s) 110 to tags that define each component. The cognitive automation system (110 or the like) can then process each portion of the data and transform it into machine language if desired. As part of the parsing step, ordinary text can be broken up and used by cognitive automation computing machine(s) 110. For example, search engines typically parse search phrases entered by users so that they can more accurately search for each word. And, the cognitive automation system can parse text documents and extract certain information like names or addresses. Moreover, in the example of a spreadsheet, the cognitive automation system can turn formatted documents into tables with rows and columns by parsing the text.

Next, in step 304, the parsed information can be normalized by cognitive automation computing machine(s) 110. This is a process that breaks down data into record groups for efficient processing. There are typically six stages. By the third stage (third normal form), data are identified only by the key field in their record by cognitive automation computing machine(s) 110. For example, ordering information is identified by cognitive automation computing machine(s) 110 by order number, and customer information by customer number. A major goal of normalization by cognitive automation computing machine(s) 110 is to eliminate redundancy by having a data element represented in only one place. In the context of a database, the normalization by cognitive automation computing machine(s) 110 can involve dividing data into two or more tables and defining relationships between the tables. The objective for the cognitive automation computing machine(s) 110 is to isolate data so that additions, deletions, and modifications of a field can be made in just one table and then propagated by cognitive automation computing machine(s) 110 through the rest of the database via the defined relationships.

Typically, there are there are three main normal forms, each with increasing levels of normalization. The first is a first normal form (1NF), wherein each field in a table contains different information. For example, in an employee list, each table would contain only one birthdate field. In the second normal form (2NF), each field in a table that is not a determiner of the contents of another field must itself be a function of the other fields in the table. In the third normal form (3NF), no duplicate information is permitted. So, for example, if two tables both require a birthdate field, the birthdate information would be separated into a separate table, and the two other tables would then access the birthdate information via an index field in the birthdate table. Any change to a birthdate would automatically be reflect in all tables that link to the birthdate table. Further, additional normalization levels can be utilized such as the Boyce Codd Normal Form (BCNF), fourth normal form (4NF) and fifth normal form (5NF). While normalization makes databases more efficient to maintain, they can also make them more complex because data is separated into so many different tables. Additionally and/or alternatively, the normalization may be considered as a process applied by cognitive automation computing machine(s) 110 to all data in a set that produces a specific statistical property.

Next, in step 306, the normalized data can be segmented by cognitive automation computing machine(s) 110. This refers to the breaking of packets, by cognitive automation computing machine(s) 110, into smaller pieces in order to overcome the restrictions of network bandwidth and/or limitations in the communication channels. Applicable portions of the segmented data can be joined back together at receivers once distribution and/or dissemination is complete in step 308.

Additionally and/or alternatively, the segmented data can be validated in step 310 by cognitive automation computing machine(s) 110 either prior to or immediately after distribution and dissemination in step 308. The validation can include one or more functions performed by cognitive automation computing machine(s) 110 such as, for example: data validation by ensuring that the data satisfies defined formats and other input criteria; forecast verification by validating and verifying prognostic output from numerical models; regression validation by determining whether the outputs of a regression model are adequate; social validation to verify compliance in a social activity to fit in and be part of the majority; statistical model validation by determining whether the outputs of a statistical model are acceptable; documenting that a process or system meets its predetermined specifications and quality attributes; checking that the segmented and normalized data meets specifications and fulfills its intended purpose; and/or checking the data to confirm that it both is well-formed and follows a defined structure.

After validation in step 310 and as a result of distribution/dissemination in step 308, the segmented, validated, and normalized data can be received as in step 312 by systems, data store(s), and/or data source(s) to be updated, thereby obviating the need for repetitive data entry.

In step 314, the received data can be enriched by cognitive automation computing machine(s) 110. As used herein, data enrichment refers to processes, performed by cognitive automation computing machine(s) 110, that are used to enhance, refine or otherwise improve the received data. This idea and other similar concepts contribute to making data a valuable asset for almost any modern business or enterprise. It also shows the common imperative of proactively using this data in various ways. Although data enrichment can work in many different ways, many of the tools used for this goal involve a refinement of data, by cognitive automation computing machine(s) 110, that might include small errors. A common data enrichment process, implemented by cognitive automation computing machine(s) 110, could, for example, correct likely misspellings or typographical errors in a database through the use of precision algorithms. Following this logic, data enrichment tools could also add information to simple data tables. Another way that data enrichment can work, as used herein, is in extrapolating data. Through methodologies such as fuzzy logic, more information can be produced from a given raw data set.

Relatedly, based on data enrichments in step 314, recommendations may be made by the cognitive-automation system 110 to make recommendations in 316. For example, if clear relationships between data that is entered and fields in target locations are not previously established, the cognitive-automation system can make recommendations to users to suggest additional locations and/or system(s) in which the data may be useful. This could be accomplished, for example, by a series of prompts provided to the users by cognitive automation computing machine(s) 110. And, the cognitive-automation system could learn from each manual intervention and then make automatic decisions in the future based on the historical decisions.

After the data is enriched in step 314 and/or any recommendations are made by the cognitive-automation system, the data may be acted on and/or propagated in step 318, by cognitive automation computing machine(s) 110, to various target applications, systems, databases, data sources, data stores, or the like in step 320. If desired, optional automation reporting as in step 322 by cognitive automation computing machine(s) 110 can generate logs or similar reports for operator or system administrator review and further cognitive-automation refinements.

One or more aspects of the disclosure may be embodied in computer-usable data or computer-executable software or instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers, computing platforms, and/or one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A cognitive automation-based platform for propagating data across multiple systems via a private network to avoid repetitive data entry by a user, the cognitive automation-based platform comprising:
   a. a client computing machine having:
      i. at least one client processor;
      ii. at least one client communication interface communicatively coupled to the at least one client processor and the private network;
      iii. a client monitor communicatively coupled to the at least one client communication interface;
      iv. a client keyboard communicatively coupled to the at least one client communication interface;
      v. client memory communicatively coupled to the at least one client communication interface, said client memory storing client computer-readable instructions that, when executed by the at least one client processor, cause the client computing device to:
         1. receive, by the at least one client processor from a data source, input source data;
         2. store, in a first sector of the client memory, the input source data;
         3. retrieve, from the first client sector of the client memory, the input source data to be propagated;
         4. transmit, from the client computing device to a server computing device, the input source data in real-time;
   b. the server computing machine having:
      i. at least one server processor;
      ii. at least one server communication interface communicatively coupled to the at least one server processor and the private network;
      iii. server memory communicatively coupled to the server communication interface, said client memory storing server computer-readable instructions that, when executed by the at least one server processor, cause the server computing device to:
         1. receive, from the client computing device, the input source data that was transmitted in real-time;
         2. store, in a first server sector of the server memory, the input source data;
         3. parse, by the at least one server processor, the input source data into parsed data by analyzing the input source data for correct syntax;
         4. store, in a second server sector of the server memory, the parsed data;
         5. normalize, by the at least one server processor, the parsed data into normalized data by breaking the parsing data into record groups for efficient processing, said normalized data normalized into at least a first normal form;
         6. store, in a third server sector of the server memory, the normalized data;
         7. segment, by the at least one server processor, the normalized data into segmented data by breaking the normalized data into a plurality of smaller packets for efficient data transmission;
         8. store, in a fourth server sector of the server memory, the segmented data;
         9. validate, by the at least one server processor, the segmented data into validated data to ensure that the validated data satisfies defined formats and input criteria;
         10. store, in a fifth server sector of the server memory, the validated data;
         11. distribute, by the at least one server processor over the private network, the validated data into a plurality of data stores communicatively coupled to the private network, thereby propagating said validated data without said repetitive data entry by the user;
         12. enrich, by the at least one server processor, the validated data to enriched data that is corrected for any errors;
         13. store, in a sixth server sector of the server memory, the enriched data;
         14. generate, by the at least one server processor, a recommendation of at least one additional target in which the enriched data may be stored;
         15. store, in a seventh server sector of the server memory, the recommendation of said at least one additional target in which the enriched data may be stored;
         16. transmit, by the at least one server processor to the client server processor on the client computing machine over the private network, the recommendation for display in a first graphical user interface on the client monitor; and
         17. store, by the at least one server processor, the enriched data in the at least one additional target if approved by the user.

2. The cognitive automation-based platform of claim 1 wherein the input source data is a digital file.

3. The cognitive automation-based platform of claim 2 wherein the digital file comprises unstructured data.

4. The cognitive automation-based platform of claim 3 wherein the input source data is generated, by the at least one server processor, by scanning said digital file.

5. The cognitive automation-based platform of claim 4 wherein the input source data is generated, by the at least one server processor, by performing optical character recognition on said digital file.

6. The cognitive automation-based platform of claim 3 wherein validation of the segmented data into said validated data is validated, by the at least one server processor, by forecast validation based on prognostic output from at least one numerical model.

7. The cognitive automation-based platform of claim 3 wherein validation of the segmented data into said validated data is validated, by the at least one server processor, by regression validation by determine whether an output of a regression model is adequate.

8. The cognitive automation-based platform of claim 3 wherein validation of the segmented data into said validated data is validated, by the at least one server processor, by social validation to verify compliance in a social activity.

9. The cognitive automation-based platform of claim 3 wherein validation of the segmented data into said validated data is validated, by the at least one server processor, by statistical model validation to determine with outputs of a statistical model are acceptable.

10. The cognitive automation-based platform of claim 3 wherein validation of the segmented data into said validated data is validated, by the at least one server processor, by documenting that a process meets predetermined specifications and fulfills an intended purpose.

11. The cognitive automation-based platform of claim 3 wherein validation of the segmented data into said validated data is validated, by the at least one server processor, by checking whether segmented data follows a defined structure.

12. The cognitive automation-based platform of claim 3 wherein said server computer-readable instructions are performed in real-time.

13. One or more non-transitory computer-readable media storing instructions that, when executed by a cognitive automation computing platform comprising a plurality of processors in a client-server architecture communicatively coupled over a private network via a plurality of communication interfaces, cause the cognitive automation computing platform to:
  a. receive, by a first of said plurality of processors from a data source, input source data;
  b. store, by the first of said plurality of processors in a first sector of the computer-readable media, the input source data;
  c. extract in real-time, by the first of said plurality of processors from the input source data in the first sector of the computer-readable media, data to be propagated;
  d. store in real-time, by the first of said plurality of processors in a second sector of the computer-readable media, the data to be propagated;
  e. transmit in real-time, from said first of said plurality of processors to a second of said plurality of processors, the data to be propagated;
  f. receive in real-time, by the second of said plurality of processors from said first of said plurality of processors, the data to be propagated;
  g. store in real-time, by the second of said plurality of processors in a third sector of the computer-readable media, the data to be propagated;
  h. parse in real-time, by the second of said plurality of processors, the data to be propagated into parsed data by analyzing the data to be propagated for correct syntax;
  i. store in real-time, by the second of said plurality of processors in a fourth sector of the computer-readable media, the parsed data;
  j. normalize in real-time, by the second of said plurality of processors, the parsed data into normalized data by breaking the parsing data into record groups for efficient processing, said normalized data normalized into at least a first normal form;
  k. store in real-time, by the second of said plurality of processors in a fifth sector of the computer-readable media, the normalized data;
  l. segment in real-time, by the second of said plurality of processors, the normalized data into segmented data by breaking the normalized data into a plurality of smaller packets for efficient data transmission;
  m. store in real-time, by the second of said plurality of processors in a sixth sector of the computer-readable media, the segmented data;
  n. validate in real-time, by the second of said plurality of processors, the segmented data into validated data to ensure that the validated data satisfies defined formats and input criteria;
  o. store in real-time, by the second of said plurality of processors in a seventh sector of the computer-readable media, the validated data;
  p. distribute in real-time, by the second of said plurality of processors over the private network, the validated data into a plurality of data stores communicatively coupled to the private network, thereby propagating said validated data without repetitive data entry;
  q. enrich in real-time, by the second of said plurality of processors, the validated data to enriched data that is corrected for any errors;
  r. store in real-time, by the second of said plurality of processors in an eighth sector of the computer-readable media, the enriched data;
  s. generate in real-time, by the second of said plurality of processors, a recommendation of at least one additional target in which the enriched data may be stored;
  t. store in real-time, by the second of said plurality of processors in a ninth sector of the computer-readable media, the recommendation of said at least one additional target in which the enriched data may be stored;
  u. transmit in real-time, by the second of said plurality of processors to the first of said plurality of processors, over the private network, the recommendation; and
  v. store, by the second of said plurality of processors, the enriched data in the at least one additional target if approved.

14. Said one or more non-transitory computer-readable media of claim 13 wherein the input source data is a digital file.

15. Said one or more non-transitory computer-readable media of claim 14 wherein the digital file comprises unstructured data.

16. Said one or more non-transitory computer-readable media of claim 15 wherein the input source data is generated, by the second of said plurality of processors, by scanning said digital file.

17. Said one or more non-transitory computer-readable media of claim 16 wherein the input source data is generated, by the second of said plurality of processors, by performing optical character recognition on said digital file.

18. Said one or more non-transitory computer-readable media of claim 17 wherein validation of the segmented data into said validated data is validated, by the second of said plurality of processors, by forecast validation based on prognostic output from at least one numerical model.

19. Said one or more non-transitory computer-readable media of claim 18 wherein validation of the segmented data into said validated data is validated, by the second of said plurality of processors, by regression validation by determine whether an output of a regression model are adequate.

20. A cognitive automation-based method for propagating data across multiple systems via a private network to avoid repetitive data entry by a user, the method comprising the steps of:
- a. receiving, by a cognitive automation platform from a data source, input source data;
- b. storing, by the cognitive automation platform in a first sector of computer-readable media, the input source data;
- c. extracting in real-time, by the cognitive automation platform from the input source data in the first sector of the computer-readable media, data to be propagated;
- d. storing in real-time, by the cognitive automation platform in a second sector of the computer-readable media, the data to be propagated;
- e. parsing in real-time, by the cognitive automation platform, the data to be propagated into parsed data by analyzing the data to be propagated for correct syntax;
- f. storing in real-time, by the cognitive automation platform in a fourth sector of the computer-readable media, the parsed data;
- g. normalizing in real-time, by the cognitive automation platform, the parsed data into normalized data by breaking the parsing data into record groups for efficient processing, said normalized data normalized into at least a first normal form;
- h. storing in real-time, by the cognitive automation platform in a fifth sector of the computer-readable media, the normalized data;
- i. segmenting in real-time, by the cognitive automation platform, the normalized data into segmented data by breaking the normalized data into a plurality of smaller packets for efficient data transmission;
- j. storing in real-time, by the cognitive automation platform in a sixth sector of the computer-readable media, the segmented data;
- k. validating in real-time, by the cognitive automation platform, the segmented data into validated data to ensure that the validated data satisfies defined formats and input criteria;
- l. storing in real-time, by the cognitive automation platform in a seventh sector of the computer-readable media, the validated data;
- m. distributing in real-time, by the cognitive automation platform over the private network, the validated data into a plurality of data stores communicatively coupled to the private network, thereby propagating said validated data without repetitive data entry;
- n. enriching in real-time, by the cognitive automation platform, the validated data to enriched data that is corrected for any errors;
- o. storing in real-time, by the cognitive automation platform in an eighth sector of the computer-readable media, the enriched data;
- p. generating in real-time, by the cognitive automation platform, a recommendation of at least one additional target in which the enriched data may be stored;
- q. storing in real-time, by the cognitive automation platform in a ninth sector of the computer-readable media, the recommendation of said at least one additional target in which the enriched data may be stored;
- r. transmitting in real-time, by the cognitive automation platform over the private network, the recommendation; and
- s. storing, by the cognitive automation platform, the enriched data in the at least one additional target if approved.

* * * * *